Figure 1:
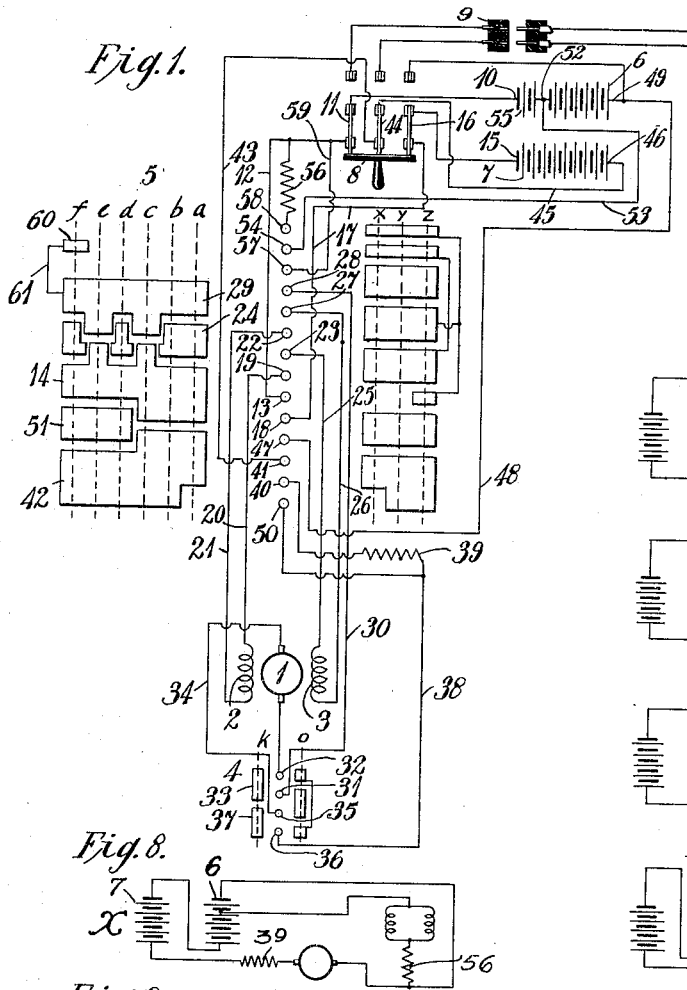

N. W. STORER.
SYSTEM AND METHOD OF CONTROL FOR ELECTRIC MOTORS.
APPLICATION FILED OCT. 5, 1912.

1,155,170.

Patented Sept. 28, 1915.
2 SHEETS—SHEET 1.

WITNESSES:
Fred H. Miller
Geo. W. Hansen

INVENTOR
Norman W. Storer
BY
Risley S. Carr
ATTORNEY

COLUMBIA PLANOGRAPH CO., WASHINGTON, D. C.

N. W. STORER.
SYSTEM AND METHOD OF CONTROL FOR ELECTRIC MOTORS.
APPLICATION FILED OCT. 5, 1912.
1,155,170.
Patented Sept. 28, 1915.
2 SHEETS—SHEET 2.
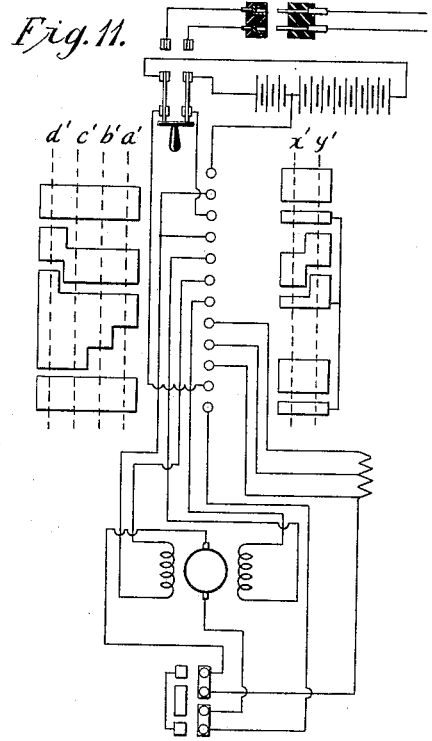
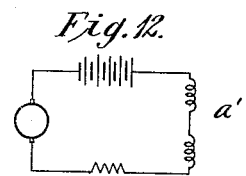
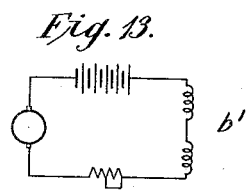
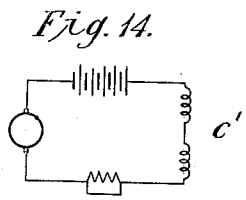
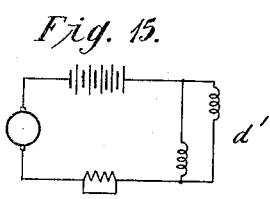
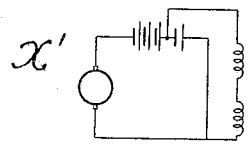
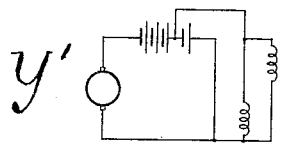

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM AND METHOD OF CONTROL FOR ELECTRIC MOTORS.

1,155,170. Specification of Letters Patent. Patented Sept. 28, 1915.

Application filed October 5, 1912. Serial No. 724,067.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems and Methods of Control for Electric Motors, of which the following is a specification.

My invention relates to systems and methods of control for electric motors, and it has special reference to the control of electric vehicle or automobile motors which are supplied with energy from storage batteries.

The object of my invention is to provide a system and method of control for an electric motor of the character indicated, whereby a plurality of motor-operating speeds and also a series of regenerative braking speeds may be secured for retarding the motor, the arrangement being such that all portions of the battery will charge and discharge substantially uniformly.

In my previous Patent No. 765,209, granted July 19, 1904 to the Westinghouse Electric & Mfg. Company, there is set forth a method of control of the general character above indicated which consists in varying the voltage applied to the motor by changing the connections of the battery from series to multiple groups, and field magnet windings of the motor from series to multiple sections.

According to my present invention, I provide a relatively high speed motor-operating connection in addition to the motor-operating connections set forth in the above-named patent, and, furthermore, I provide a series of regenerative braking positions in which the excitation of the field magnet windings is gradually increased and the circuit connections are such that energy is generated under advantageous conditions for charging the storage battery.

In my co-pending application, Serial No. 724,068, filed of even date herewith, I have set forth a control system in which automatic means are provided for adjusting and regulating the field excitation of a motor during the braking period in order to return energy to the supply of the system. My present invention has some features in common with the application referred to, but a series of control positions is provided whereby the desired field regulation may be obtained manually with relatively small expense when a storage battery constitutes the source of energy and where it would be impracticable to employ an automatic system of regulation.

Figure 8:
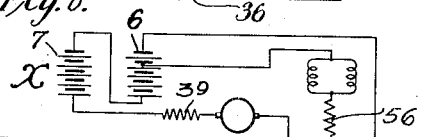
Figure 9:
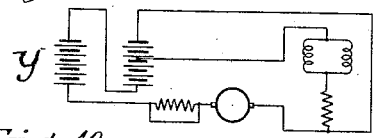
Figure 10:
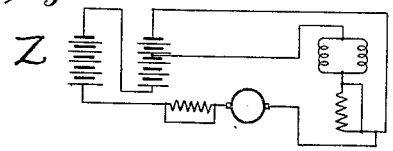

Figure 1 of the accompanying drawings is a diagrammatic view of a system of control embodying my invention, a controller of the drum type being shown developed into a single plane in a well known manner. Figs. 2 to 7, inclusive, are diagrams respectively illustrating the circuit connections for the six accelerating or motor-operating positions of the controller, and Figs. 8, 9 and 10 are similar diagrams illustrating the circuit connections for the three braking positions of the controller. Fig. 11 is a diagrammatic view, corresponding to Fig. 1, of a system which embodies a modification of my invention, and Figs. 12 to 17, inclusive, are simple diagrams illustrating the circuit connections for the various positions of the controller of Fig. 11.

Referring to Figs. 1 to 10, inclusive, of the drawings, the control system here shown comprises an electric motor having an armature 1 and field magnet windings 2 and 3, a reversing switch 4, a controller 5 adapted to occupy a plurality of motor-operating positions $a$ to $f$, inclusive, and a plurality of braking positions $x$, $y$ and $z$, storage batteries 6 and 7, a battery charging switch 8 and a charging plug 9.

The battery charging switch 8 is a triple pole, doublethrow switch and, when thrown in one direction, connects the storage batteries 6 and 7 in series relation between the terminals of the charging plug. When thrown in the opposite position, the connections of the storage batteries are dependent upon the positions of the controller 5, as hereinafter pointed out.

Figure 2:
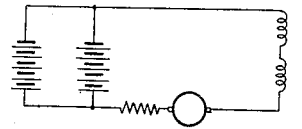

Assuming that the reversing switch 4 is moved into a position $k$ and that the controller 5 is moved into its position $a$, a connection is established from one terminal 10 of the battery 6 through a switch blade 11, a conductor 12 and a control finger 13, to a contact member 14. A connection is also established from a terminal 15 of the battery 7 through a switch blade 16, a conductor 17 and a contact finger 18 to the contact member 14, circuit being continued from this point to a contact finger 19, a conductor 20, the field magnet winding 2, a conductor 21, contact fingers 22 and 23, which are bridged by a contact member 24, a conductor 25, the field magnet winding 3, a conductor 26, contact fingers 27 and 28, which are bridged by a contact member 29, a conductor 30, contact fingers 31 and 32, which are bridged by a contact member 33 of the reverser, the motor armature 1, a conductor 34, contact fingers 35 and 36, which are bridged by a contact member 37, a conductor 38, a resister 39, contact fingers 40 and 41, which are bridged by contact member 42, a conductor 43, a switch blade 44, and a conductor 45 to a terminal 46 of the battery 7. A connection is also established from the contact member 42 through a finger 47 and a conductor 48 to a terminal 49 of the battery 6. Circuit connections are thus established as shown in Fig. 2 of the drawings.

Figure 3:
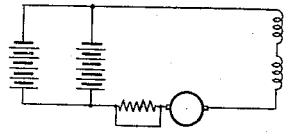

If the controller is now moved to position b, a contact finger 50 will engage the contact member 42. The resistor 39 will thus be short circuited, the connections being as shown in Fig. 3.

Figure 4:
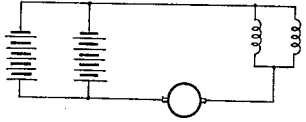
Figure 5:
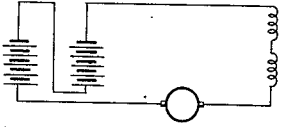
Figure 6:
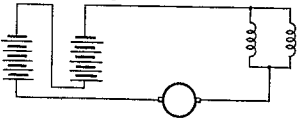

If the controller is moved to position c, the terminals 10 and 15 of the storage batteries are still connected to the contact member 14, circuit being continued from this point through the finger 19, the conductor 20, the field magnet winding 2, a conductor 21, and the contact finger 22 to the contact member 29. The contact finger 23 also engages the contact member 14, and, consequently, the field magnet winding 3 is connected to the contact members 14 and 29 in parallel relation with the field magnet winding 2. The circuit connections are otherwise the same as before, and, consequently, the arrangement of Fig. 4 is obtained.

In position d of the controller, the field magnet windings 2 and 3 are restored to their series relation as in positions a and b but the storage batteries are changed from a multiple to a series relation since contact fingers 18 and 47 become respectively disengaged from the contact members 14 and 42 and are interconnected by a contact member 51. (See Fig. 5).

In position e, the field magnet windings 2 and 3 are again connected in multiple circuit relation, the batteries being still connected in series. (See Fig. 6).

Figure 7:
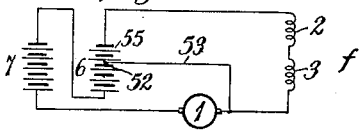

In position f, the field magnet windings are again connected in series relation but a cross connection is established from an intermediate point 52 in the storage battery 6 through a conductor 53 and a contact finger 54, which now engages a contact member 60, continues through a conductor 61 to a contact member 29 to one terminal of the motor armature, the connection being such as to throw a portion 55 of the storage battery 6 directly across the field magnet windings 2 and 3 as shown in Fig. 7.

It thus appears that a plurality of gradually-increasing motor speeds are provided by first establishing a low-voltage connection between the batteries, a strong field and including a resistance in the armature circuit. The armature resistance is then excluded, the field weakened by connecting its parts in multiple relation, a high-voltage connection established by connecting the batteries in series, first with a strong field, then with a weaker field, and finally establishing an armature circuit through the interconnection provided by the conductor 53 independent of the field magnet windings, thereby materially weakening the field strength.

Assuming that the motor is operating at relative high speed and that it is desired to bring it to rest, the controller 5 is thrown to successively occupy positions $x$, $y$ and $z$, and the reversing switch is thrown to the position o.

In position $x$ of the controller 5, the circuit connections correspond to those established in position f except that the field magnet windings 2 and 3 are connected in multiple relation and are reversed, the armature 1 is connected across the entire batteries in series, the resistor 39 is included in the armature circuit, and a resistor 56 is included in series with the field branch of the circuit. By this means, a regenerative circuit is established which tends to charge the battery 7 and the battery 6, in addition to retarding the speed of the motor. As the speed of the motor is reduced, the controller may be moved into position $y$ in which the resistor 39 is short circuited, and finally into position $z$ in which both the resistors 39 and 56 are short circuited.

From the above description and the drawings, it will be readily understood that, under the most usual motor operating conditions, that is, when the controller 5 occupies its position f and the motor is running at its highest speed, the portion 55 of the battery 6 is discharged at a slower rate than the remainder thereof and the battery 7. On the other hand, when the motor is operating regeneratively, the portion 55 of the battery 6 is charged at a slower rate than the remainder thereof and the battery 7, because the said portion 55 is connected in parallel to the motor field magnet windings. The arrangement is such that the portion 55 will discharge and charge at such a rate as to maintain its condition of charge substantially the same as that of the remaining cells of the batteries. Since the portion 55 is connected in parallel with the motor field magnet windings for regenerative operation, it serves to determine, to a certain degree, the drop of potential across the field magnet windings, with the result that, under regenerative operating conditions, the field strength of the motor is maintained substantially uniform, except when varied by change of resistance.

Instead of connecting the field magnet windings 2 and 3 in series relation in position $f$ of the controller, as shown in Fig. 7, they may be connected in multiple circuit relation and a suitable resistance included in series with them, and, on the contrary, the field magnet windings may be connected in series relation in the regenerative braking positions $x$, $y$ and $z$, or the series relation may be utilized in some of the regenerative positions and the multiple circuit relation in others.

Referring to Figs. 11 to 17, of the drawings, in which corresponding parts are designated by the same reference characters, the controller here shown differs from that of the previous figures in that a series connection is always maintained between the cells of the storage battery, the armature resistor being included in the first motor-operating position, partially excluded in the second, and wholly short-circuited in the third. In the fourth motor-operating position, the field magnet windings 2 and 3 are changed from a series to a multiple circuit relation.

When the controller occupies its dynamic braking position $x^1$, the field magnet windings are, of course, reversed, the motor armature is connected across the entire storage battery and the field magnet windings are connected in series relation across a portion of the storage battery.

In the position $y^1$, the field magnet windings are changed from a series to a multiple circuit relation.

Other braking positions may, of course, be established by inserting in the first position suitable resistance in the armature and field circuits and afterward excluding the same.

Variations in the circuit connections and the arrangements of the control positions may be effected within the spirit and scope of my invention, and I desire that only such limitations shall be imposed as are indicated in the appended claims.

I claim as my invention:

1. The method of operating an electric motor regeneratively which consists in connecting the motor field magnet windings and a portion of the battery in parallel with each other and in series with the motor armature and the remainder of the battery.

2. The method of controlling an electric motor which consists, for motor operation, in connecting the armature and field magnet windings thereof in series with each other and with a battery, and an intermediate point of the battery to the connection between the armature and field magnet windings, and, for regenerative operation, in connecting the motor field magnet windings and a portion of the battery in parallel with each other and in series with the motor armature and the remainder of the battery.

3. The method of controlling an electric motor that is supplied with energy from a storage battery which consists in connecting the armature and field magnet windings in series relation across the storage battery and interconnecting a point between the armature and field magnet windings and an intermediate point in the battery for relatively high-speed operation.

4. The method of controlling an electric motor that is supplied with energy from a storage battery which consists in connecting storage battery cells in multiple groups and the armature and field magnet windings of the motor in series relation across the terminals of said groups for low-speed operation and connecting the storage battery cells in series relation and establishing a cross connection from between the armature and field magnet windings to an intermediate point in the storage battery for high-speed operation.

5. The method of controlling an electric motor that is supplied with energy from a storage battery which consists in connecting storage battery sections in multiple relation, the field magnet winding sections in series relation and in series with the motor armature for low-speed operation, connecting the storage battery sections in series relation for an intermediate operating speed and establishing a cross connection from between the armature and field magnet windings to an intermediate point in the storage battery for high-speed operation.

6. The method of controlling an electric motor that is supplied with energy from a storage battery which consists in the following steps: first, connecting a storage battery in parallel sections, the field magnet winding in series sections and in series relation with the motor armature; second, connecting the field magnet winding in parallel sections; third, connecting the storage battery in series sections and the field magnet windings in series sections; fourth, connecting the field magnet windings in parallel sections, and fifth, establishing a cross connection for high-speed operation from between the armature and field magnet windings to an intermediate point in the storage battery.

7. The method of controlling an electric motor that is supplied with energy from a storage battery which consists in connecting the armature and field magnet windings of the motor in series relation across the battery for low-speed operation, and establishing an armature circuit independent of the field magnet windings and embracing a portion of the storage battery for high-speed operation.

8. The method of controlling an electric motor that is supplied with energy from a storage battery which consists in connecting the armature and field magnet windings of the motor in series relation across the battery for low-speed operation, establishing an armature circuit independent of the field magnet windings and embracing a portion of the storage battery for high-speed operation and maintaining the high-speed connection with the field magnet winding reversed for regenerative braking.

9. The method of controlling a dynamo-electric machine having electrical relations with a source of energy, which consists in connecting the machine field windings and a portion of said source of energy in parallel with each other and in series with the machine armature and remaining portion of said source of energy.

10. The method of controlling a dynamo-electric machine having electrical relations with a source of energy, which consists in connecting in series circuit relation, the machine armature, a portion of the source of energy, and a divided circuit including the remaining portion of said source and the machine field windings.

11. The method of operating an electric motor from a battery which consists in connecting the motor field windings and portion of said battery in multiple and in series with the motor armature and remaining battery portion.

12. The method of controlling an electric motor during motor operation and regeneration which consists in connecting the motor field windings and a portion of a battery in multiple with each other and in series with another portion of the battery and the motor armature.

13. The method of operating an electric motor from a battery which consists in discharging energy at different rates from different portions of said battery respectively to the motor field windings and the motor armature during motor operation, and charging said portions of said battery at the same relative rates from said motor during regeneration.

14. The method of operating an electric motor which consists in connecting the motor armature in series with a portion of said battery and the motor field windings in multiple to the remaining portion of said battery during both motor operation and regeneration, whereby the relative rates of charge and discharge of the different battery portions are substantially maintained.

15. The method of operating an electric motor from a battery which consists in connecting the armature and field windings of the motor in series relation across the battery for low-speed operation and in connecting the armature and field windings respectively across different portions of the battery for high speed operation.

16. In a control system, the combination with an electric motor having an armature and field windings and a storage battery, of a switching device for connecting the field windings and a portion of said battery in multiple to each other and in series with the remaining portion of said battery and the motor armature.

17. In a control system, the combination with a motor having field windings and an armature and a storage battery, of a controller adapted to govern the operation of said motor during acceleration and retardation and to connect the motor armature and the motor field windings respectively across different portions of said battery during both operations.

18. The method of controlling a dynamo-electric machine which consists in connecting the armature and field magnet windings of said machine in separate circuits across different portions of a storage battery during motor operation, and maintaining said connections and reversing said field magnet windings during regenerative braking.

19. The method of operating a dynamo-electric machine from a storage battery, which consists in connecting the armature and field magnet windings across different portions of said battery during motor operation whereby said portions of the battery are discharged at different rates, and maintaining the same circuit connections with the field magnet windings reversed during regeneration, whereby said portions of the battery are charged at the same relative rates that they are discharged.

20. The method of operating a dynamo-electric machine from a storage battery, which consists in connecting the armature and field-magnet windings in series circuit with the whole of the storage battery for low-speed operation, and in separate multiple circuits across different portions of said battery for high-speed operation, whereby the whole of said battery is discharged at the same rate at low speed and the different portions discharged at relatively different rates at high speed, and in maintaining the high-speed connections with reversed field-magnet windings during regeneration, whereby the different portions of the battery are charged at substantially the same relative rates that they are discharged at high-speed operation, in such manner that the several battery portions are maintained in a substantially uniform state of charge or discharge.

In testimony whereof, I have hereunto subscribed my name this fourth day of October, 1912.

NORMAN W. STORER.

Witnesses:
O. BIELER,
B. B. HINES.